United States Patent
Ma (10) Patent No.: US 8,382,495 B1
(45) Date of Patent: Feb. 26, 2013

(54) PORTABLE ELECTRONIC DEVICE HAVING A CAM MECHANISM FOR PLUG EXTENSION AND RETRACTION

(76) Inventor: Tien-Chi Ma, New Taipei (TW)

(*) Notice: Subject to any disclaimer, the term of this patent is extended or adjusted under 35 U.S.C. 154(b) by 0 days.

(21) Appl. No.: 13/292,230

(22) Filed: Nov. 9, 2011

(30) Foreign Application Priority Data

Aug. 31, 2011 (TW) .............................. 100131302 A (51) Int. Cl.
*H01R 13/44* (2006.01)
(52) U.S. Cl. ........................................................ 439/131
(58) Field of Classification Search .................. 439/131
See application file for complete search history.

(56) References Cited

U.S. PATENT DOCUMENTS

| | | | | |
|---|---|---|---|---|
| 7,740,494 B2* | 6/2010 | Lin et al. | ........................ | 439/131 |
| 7,850,468 B2* | 12/2010 | Ni et al. | ........................ | 439/131 |
| 8,059,394 B2* | 11/2011 | Wang | ........................ | 361/679.32 |
| 2011/0059636 A1* | 3/2011 | Ni et al. | ........................ | 439/131 |

* cited by examiner

*Primary Examiner* — Gary F. Paumen
(74) *Attorney, Agent, or Firm* — Bacon & Thomas, PLLC (57) ABSTRACT

The present invention relates to a portable electronic device, which includes a housing having a receiving space therein, a core element received in the receiving space and having a plug at a front end thereof and a track adjacent to a rear end thereof, and a cam pivotally connected to the housing at a position adjacent to a first end thereof. When the first end of the cam is turned (e.g., by the user) in a certain direction, a second end of the cam is moved toward a plug opening of the housing. As a result, a pin at a second end of the cam presses against the track and thereby pushes the core element and extends the plug out of the housing through the plug opening. Due to the simple structure, the portable electronic device can be rapidly produced by an automated assembly process.

12 Claims, 8 Drawing Sheets

PORTABLE ELECTRONIC DEVICE HAVING A CAM MECHANISM FOR PLUG EXTENSION AND RETRACTION

FIELD OF THE INVENTION

The present invention relates to a portable electronic device having a cam mechanism for plug extension and retraction, which includes a housing, a core element received in the housing and having a plug at it front end and a track adjacent to its rear end of the core element, and a cam pivotally connected to the housing, such that rotating the cam in one direction pushes the core element and extends a plug, and rotating the cam in an opposite direction pulls the core element and retracts the plug

BACKGROUND OF THE INVENTION

Current consumer electronics market is supplied with a variety of useful and small portable electronic devices that have become everyday carry items. Some notable examples of such devices are Bluetooth adapters, Universal Serial Bus (USB) flash drives, card readers, and WiFi adapters. These portable electronic devices typically include a core element provided in a housing, wherein the term "core element" as used herein refers mainly to a circuit board with a plug. The circuit board can be a flash memory module or a wireless communication module, but is not limited to the foregoing. The plug, on the other hand, can be a FireWire plug, an External Serial ATA (eSATA) plug, or a USB plug, to name only a few common plug standards. The plug is to be connected to a connector of an electronic apparatus, such as a laptop computer or a digital picture frame, so as to enable electrical connection and data transfer between the portable electronic device and the electronic apparatus.

A common mean of protecting the plug on the electronic device from damages when the device is not in use is to retract the plug into the housing. The mechanism disclosed in the prior art comprises a core element that can be moved to a retracted or extended position with a spring supported slide button. A main drawback of such mechanism is that the spring tends to fail due to material fatigue after repeated use. Another drawback of the mechanism is a strong friction between the housing and the carrier tray induced by the spring loaded slide button, which makes extension and retraction of the plug awkward, thus an exotic and more costly material, such as polyoxygenmethylene (POM) is preferably used to make the carrier tray. An improvement, as taught in the other prior art, uses a scotch yoke mechanism for retraction and extension of the plug. Please refer to FIG. 1 for a portable electronic device 1 having a rotary mechanism for plug extension and retraction. The core element 10 of the portable electronic device 1 is located in a housing 11, has a front end provided with a plug 100, and, as shown more clearly in FIG. 2, includes a circuit board 101. The portable electronic device 1 further includes a rail element 12, a sliding block 13, a crank 14, and a knob 15. The rail element 12 is connected to the core element 10. The sliding block 13 is engaged with the crank 14. The sliding block 13 is slidable in the slide rail of the rail element 12. The turning block 15 is inserted through the housing 11 and connected to the crank 14.

Figure 1:
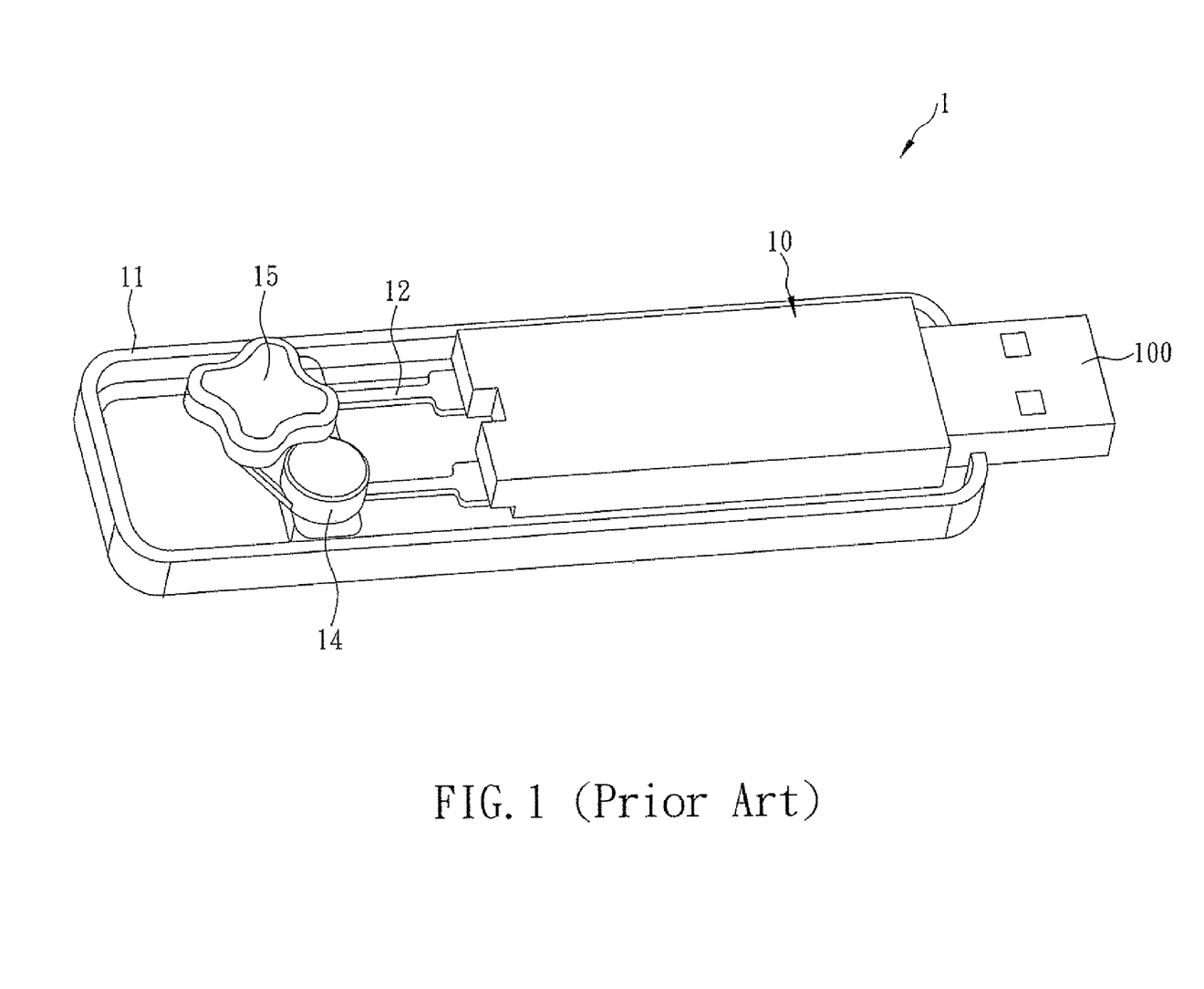
FIG. 1 is a partial perspective view of a conventional portable electronic device.
Figure 2:
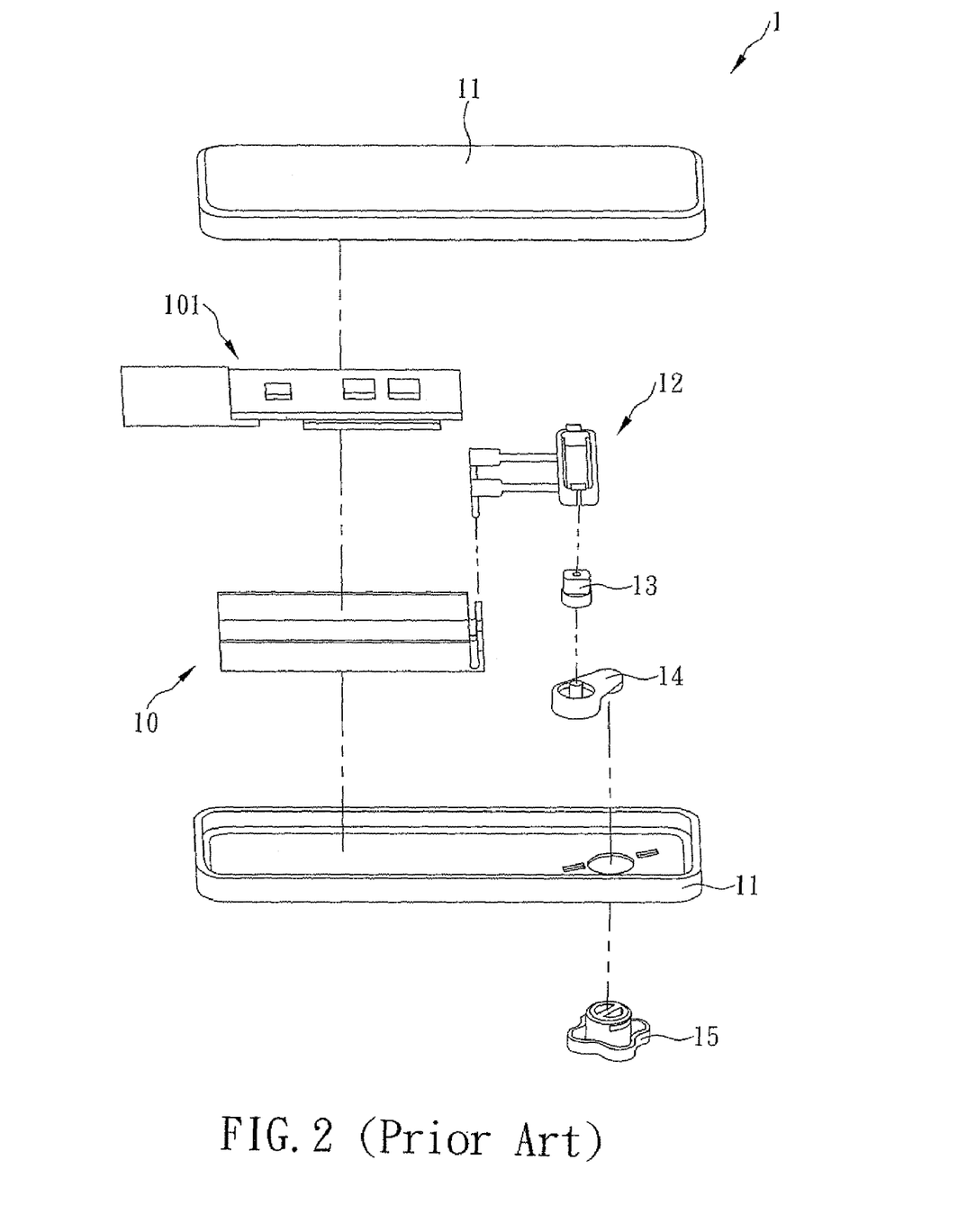
FIG. 2 is an exploded perspective view of the conventional portable electronic device depicted in FIG. 1.

As shown in FIGS. 1 and 2, the plug 100 is extended from the housing 11 by rotating the knob 15, which in turn rotates the crank 14 about an axis defined by the knob 15 and drives the sliding block 13 to slide in the slide rail of the rail element 12. Consequently, the rail element 12 pushes the core element 10, and the plug 100 is moved out of the housing 11. When the knob 15 is turned in the opposite direction, the crank 14 is rotated therewith to drive the sliding block 13 and hence the rail element 12, thereby pulling the core element 10 inward; as a result, the plug 100 is moved into the housing 11. The mechanism effectively resolves the problems of a slide button type extension/retraction mechanism, but a major drawback of the portable electronic device 1 is that the knob 15 has to be rotated 180 degrees in order to fully extend the plug 100, which is rather burdensome to the users. Another drawback of the portable electronic device 1 is its complex structure and great number of components. Assembling these components requires a meticulous effort, and has to be done manually; using a lower cost automated process is not technically feasible. A further drawback caused by the large number of components is a greater susceptibility to errors or damage during assembly and consequently leads to a low yield rate. More importantly, the complicated structure prevents the conventional portable electronic device 1 from miniaturization, the volume of the device seldom meets user needs or design requirements.

Therefore, the present invention addresses the need for a plug extension/retraction mechanism that overcomes the various drawbacks of the prior arts, a mechanism that is user friendly, robust, easy to manufacture and cost effective.

BRIEF SUMMARY OF THE INVENTION

In consideration of the aforementioned drawbacks of the prior art portable electronic devices, the inventor discloses herein a portable electronic device having a cam mechanism for plug extension and retraction. The present invention allows easy extension and retraction of the plug of the portable electronic devices and further substantially simplifies the structural design, with a view to enhance product robustness, improve production efficiency and quality yield, and use low cost materials.

The portable electronic device disclosed herein has a housing, a core element, and a cam. The housing has a lateral plug opening and a receiving space extending from the plug opening inward. The core element is received in the receiving space and includes a circuit board, a plug connected to the circuit board and corresponding in position to the plug opening, and a track positioned adjacent to the rear end of the core element. The cam is pivotally connected to the housing and has a first end, which is an actuation portion that extends outward of the housing so as to be turned by the user. The cam further has a pin, which is adjacent to a second end of the cam and slidably coupled with the track on the core element. The pin is located at a first end of the track while the plug is received in the receiving space. When rotating the actuation portion of the cam in a first direction, the pin slides toward the second end of the track and thereby push the core element to extend the plug out of the housing. When rotating the actuation portion of the cam opposite to the first direction, the pin slides toward the first end of the track and pulls the core element and retracts plug back into the housing. The minimal number of components and the simple structure of portable electronic device according to the present invention provides feasibility for an automated assembly process, thus enhancing production efficiency, economy and quality.

It is another object of the present invention to provide the foregoing portable electronic device, wherein the core element further includes a tray for supporting the circuit board, and the track is formed adjacent to the rear end of the tray. The tray slides forward and backward in the housing in connection to rotation of the cam, thus retracts and extends the plug in and out of the housing.

Yet another object of the present invention is to provide the foregoing portable electronic device, wherein an axis of the track (defined as the line connecting the first and the second ends of the track) forms a first angle with a longitudinal axis of the portable electronic device, and the first angle is greater than or equal to 45 degrees and less than 90 degrees, in order to fully extend the plug by turning the cam less then 90 degrees.

Still another object of the present invention is to provide the foregoing portable electronic device, wherein the line connecting the pin and the pivotally connecting portion of the cam forms a second angle with the longitudinal axis of the portable electronic device, and the second angle is less than 45 degrees. This prevents the plug from being pushed back into the housing during the insertion of the portable electronic device into a socket on a host electronic apparatus.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

The inventor of the present invention has long been engaged in the research and development of portable electronic devices and thus found the shortcomings of the prior art. As previously mentioned, the portable electronic devices existing in the prior art use a rotating mechanism to extend and retract the plug are typically disadvantaged by an overly complex structure, an excessively large number of components, and a complicated assembly procedure that hinders automated production and lowers manufacturing efficiency. In addition, the prior art devices are inconvenient to use, for the turning knob must be rotated 180 degrees in order to fully extend the plug. In view of these drawbacks, the inventor of the present invention invented a portable electronic device having a cam mechanism along with a core element formed with a plug at it front end and a track adjacent to its rear end, and a cam pivotally connected to the housing, thus the core element is moved linearly along the longitudinal axis of the housing by rotating the cam, thereby achieving extension or retraction of the plug.

Figure 3:
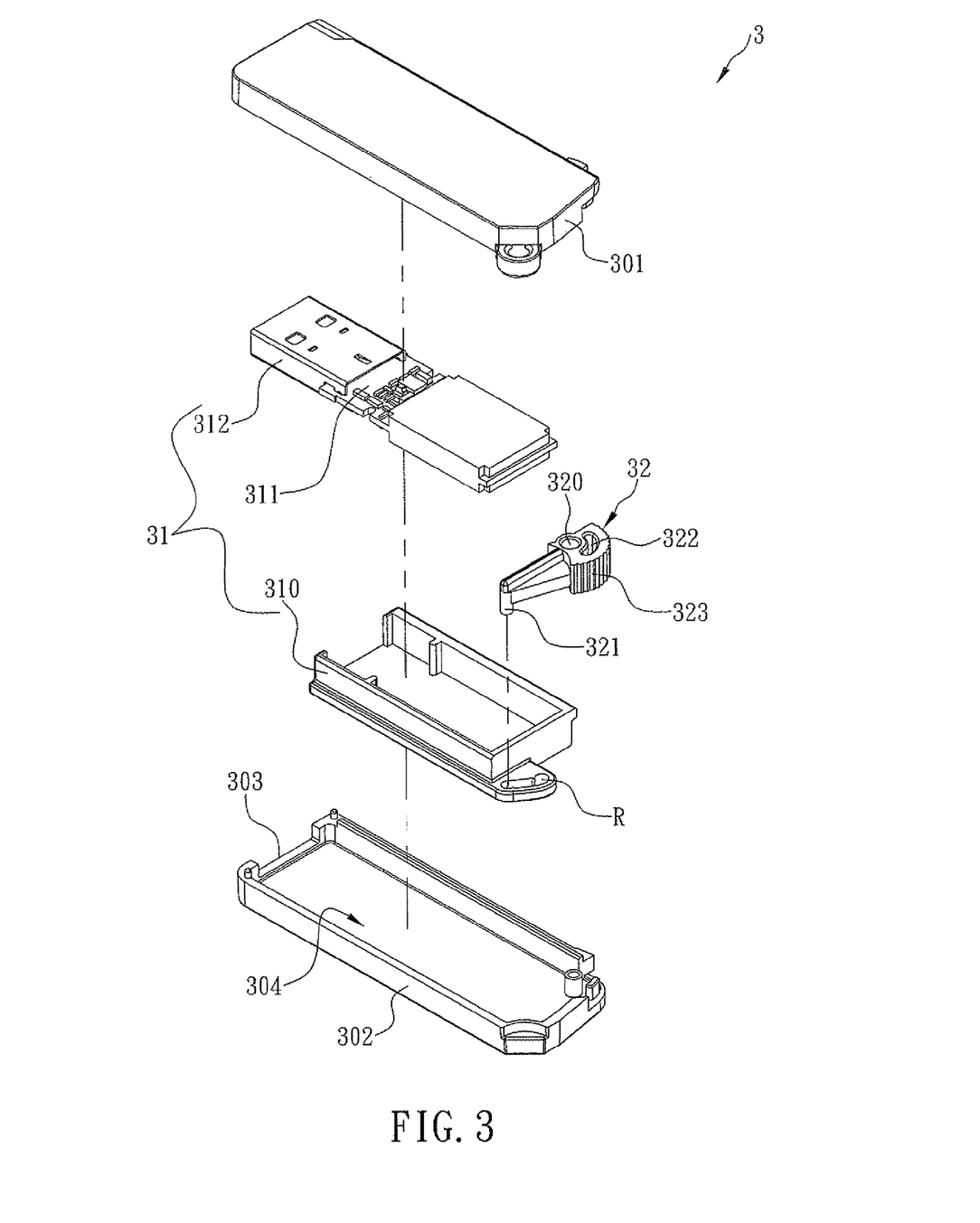
FIG. 3 is an exploded perspective view of the first preferred embodiment of the present invention.
Figure 4:
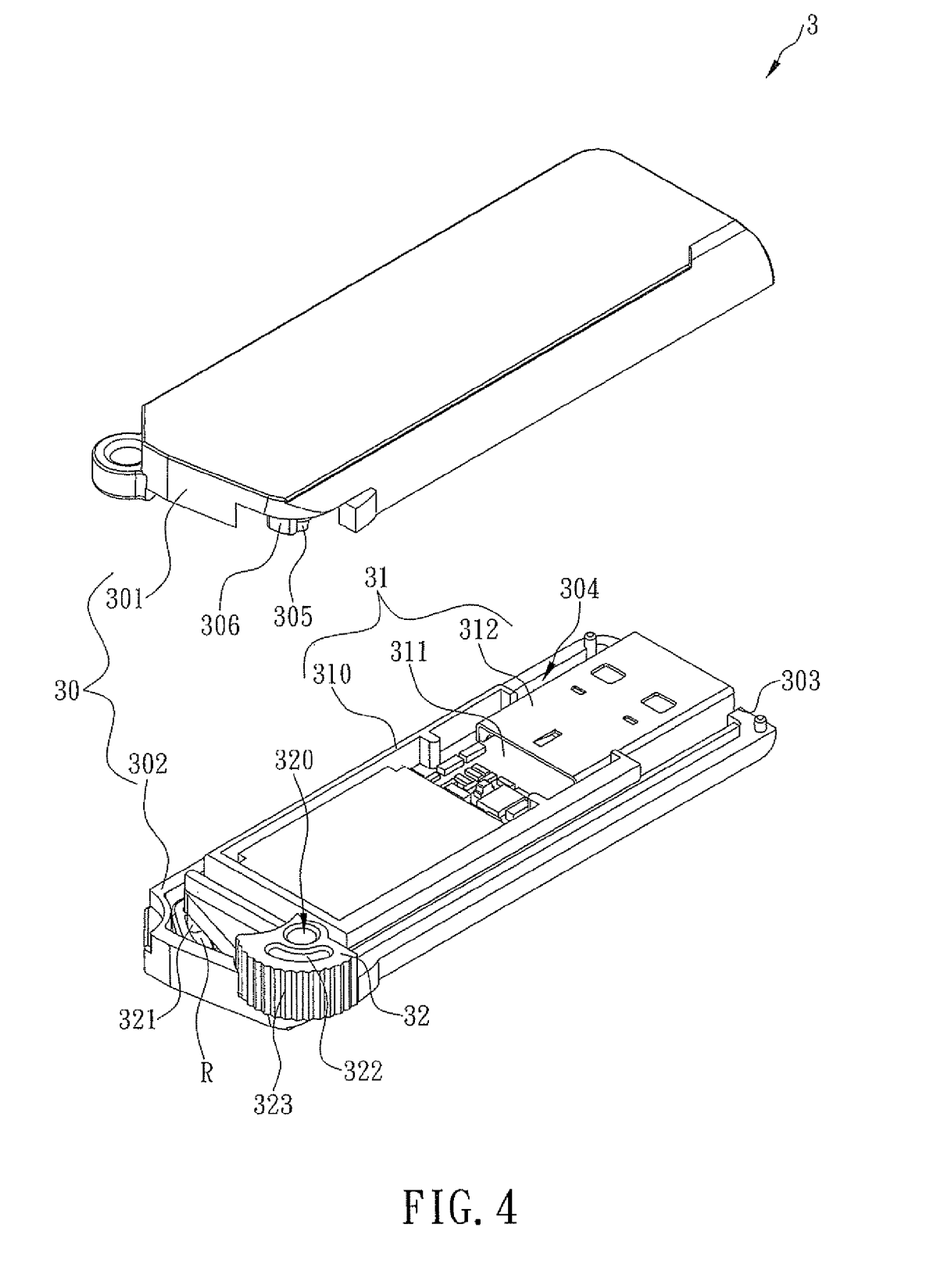
FIG. 4 is a partially exploded perspective view of the first preferred embodiment of the present invention.
Figure 5:
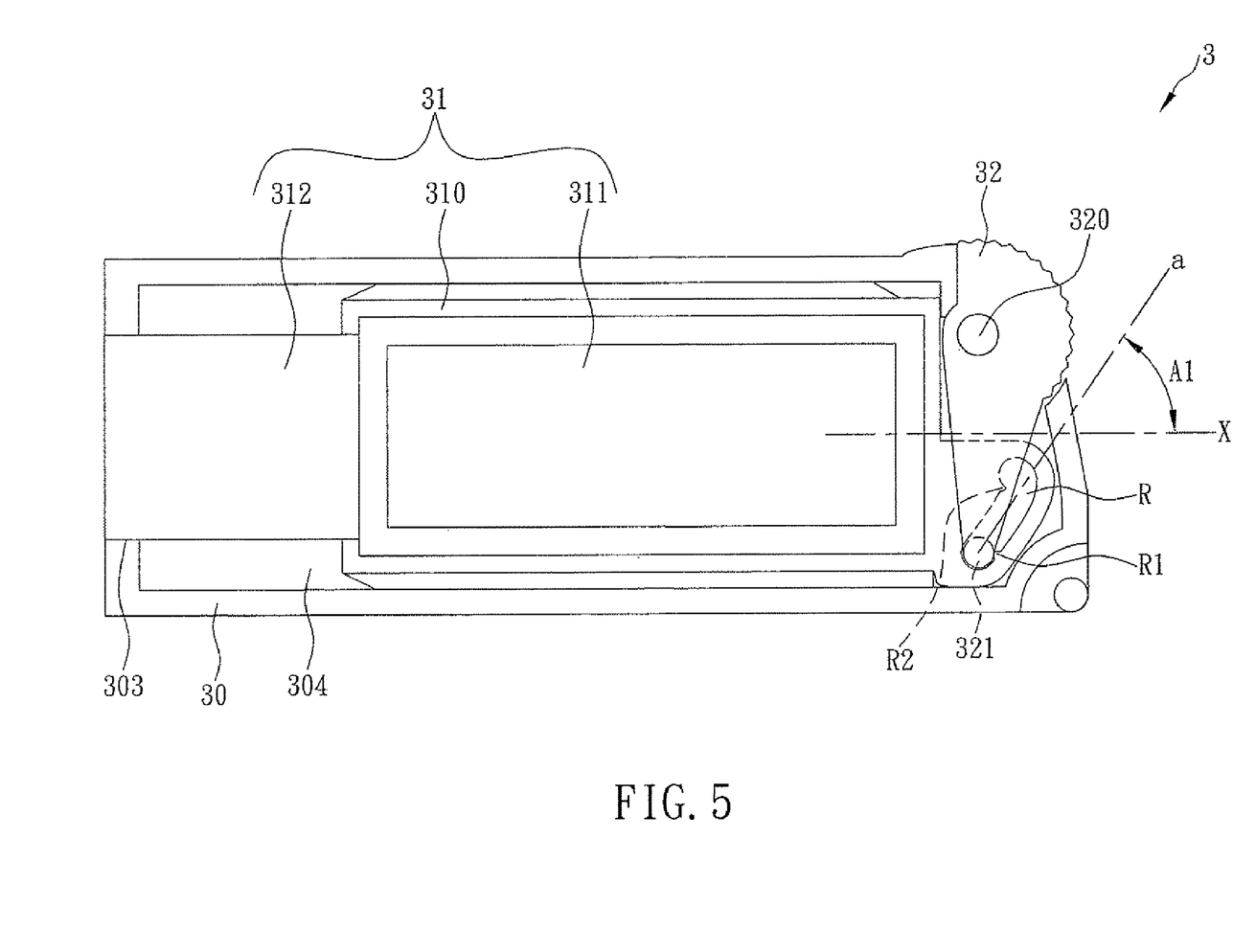
FIG. 5 is a schematic view of the first preferred embodiment of the present invention.

Referring to FIGS. 3 and 4, a portable electronic device 3 according to the first preferred embodiment of the present invention includes a housing 30, a core element 31, and a cam 32. The housing 30 is made of metal or plastic and includes an upper housing member 301 and a lower housing member 302. The housing 30 has a plug opening 303 on one lateral side and a receiving space 304 that extends inward from the plug opening 303. The core element 31 is received in the receiving space 304 and, as in the first preferred embodiment, includes a tray 310, a circuit board 311, and a plug 312. The circuit board 311, which is supported in the tray 310, includes a memory module or a communication module (e.g., a Bluetooth module, a WiFi module, etc.). The plug 312 is provided at the front end of the circuit board 311, and located at a position corresponding to the plug opening 303. The plug 312 in this embodiment conforms to the USB specifications, but the present invention imposes no limitations in this regard. The portable electronic device 3 can be designed and manufactured according to practical needs and adopt other plug specifications as well. For instance, the plug 312 can be an External Serial ATA (eSATA) or FireWire plug. All variations and combinations easily conceivable by a person skilled in the art should be viewed as equivalent changes made to the present invention and fall within the scope of the appended claims. As shown in FIG. 5, a track R is formed on the tray 310 adjacent to the rear end thereof. An axis which connects the first end and the second end of the track R forms a first angle A1 with a longitudinal axis X of the portable electronic device 3, wherein the first angle A1 is greater than or equal to 45 degrees and less than 90 degrees. The axis a refers to the straight line connecting the two ends of the track R.

As shown in FIGS. 3 and 4, the cam 32 has a first part of a pivot portion 320, which is adjacent to a first end of the cam 32 and formed as a pivot hole. The housing 30 (or more particularly, the upper housing member 301) has a second part of the pivot portion 305 corresponding in position to the first part of the pivot portion 320 and formed as a pivot axis. The first part of the pivot portion 320 is pivotally connected to the second part of the pivot portion 305 such that the cam 32 is pivotally connected to the housing 30. The first end of the cam 32 is an actuation portion 323, which extends out of the housing 30 so as to be turned by the user or driven by another element. The cam 32 further has a first part of a rotation-limiting portion 322 adjacent to the first part of the pivot portion 320, and the housing 30 further has a second part of the rotation-limiting portion 306 corresponding in position to the first part of the rotation-limiting portion 322. The first and the second parts of the rotation-limiting portions 322, 306 are slidably connected to each other and are configured for limiting the rotation angle of the cam 32. In addition, the cam 32 has a pin 321, which is adjacent to a second end of the cam 32 and slidably provided in the track R. As shown in FIG. 5, the track R has a first position-limiting portion R1 and a second position-limiting portion R2, which are adjacent to a first end and a second end of the track R respectively. Referring to FIGS. 4 and 5, when the plug 312 is received in the receiving space 304, the pin 321 is secured in position at the first end of the track R by the first position-limiting portion R1. In FIG. 5, the first part of the pivot portion 320 is adjacent to one side (e.g., the upper side as shown in the drawing) of the housing 30, while the pin 321 is adjacent to the other side (e.g., the lower side) of the housing 30. This arrangement allows the cam 32 to be increased in length in the limited space (width) of the housing 30.

Figure 6:
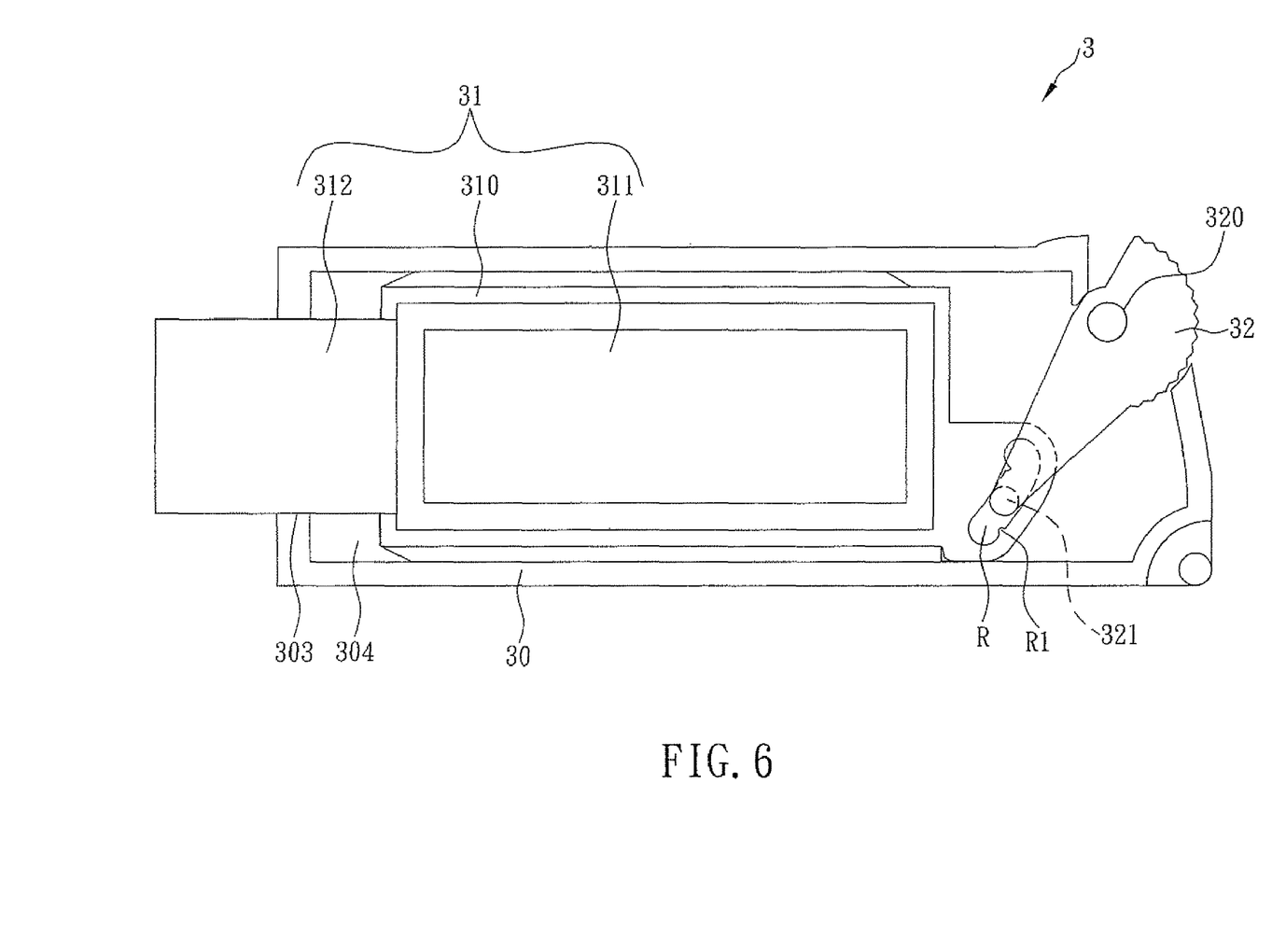
FIG. 6 is another schematic view of the first preferred embodiment of the present invention.
Figure 7:
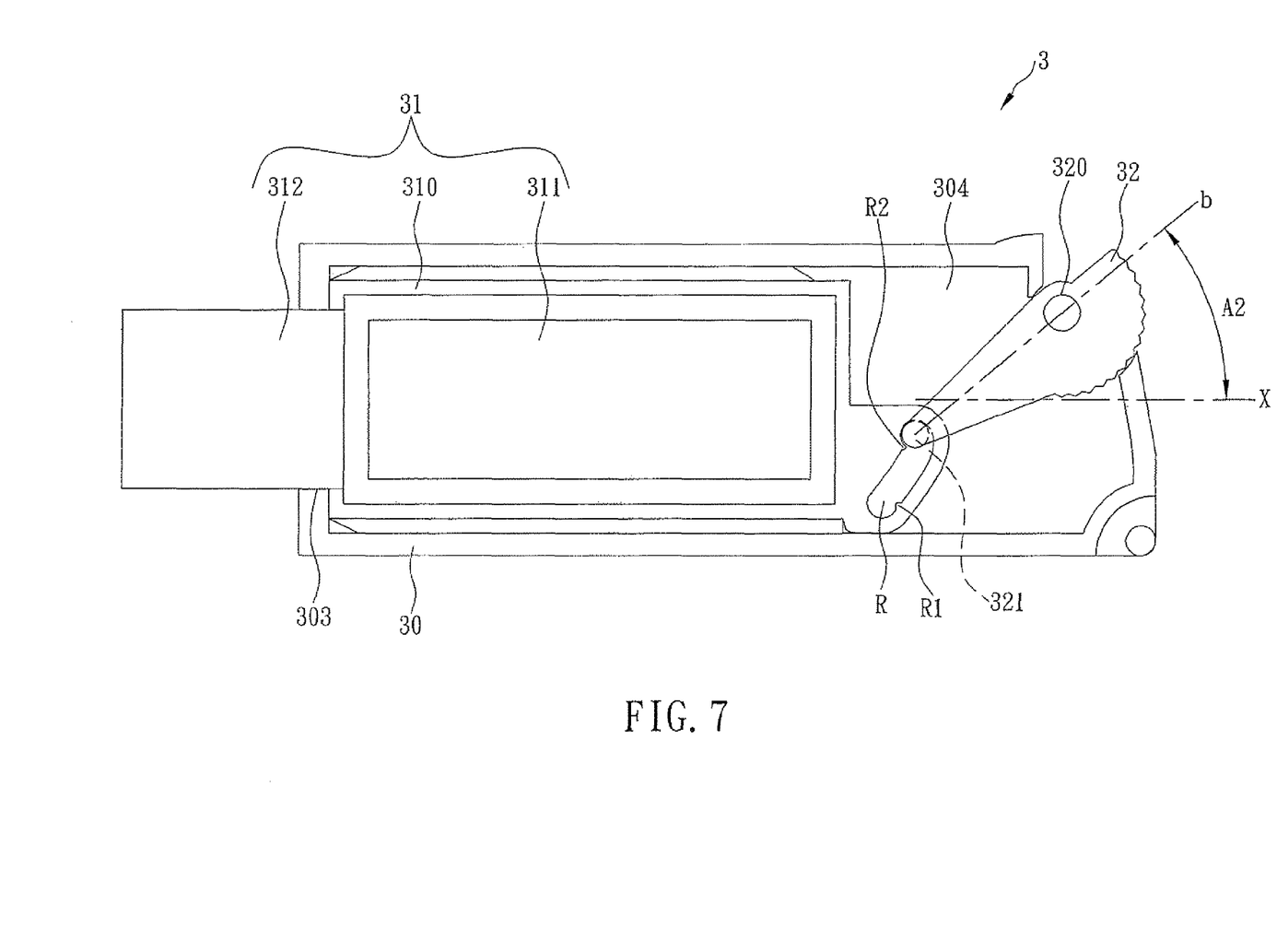
FIG. 7 is yet another schematic view of the first preferred embodiment of the present invention.

Reference is now made to FIG. 6. When the first end of the cam 32 is turned in a certain direction (e.g., clockwise as shown in FIG. 6), the second end of the cam 32 is moved toward the plug opening 303 of the housing 30. As a result, the pin 321 is disengaged from the first position-limiting portion R1 and moves in the track R. Meanwhile, the pin 321 presses against the track R and thereby pushes the core element 31 so that the plug 312 is driven out of the housing 30. The pin 321 will move along the track R until it reaches the second end of the track R (see FIG. 7). As the axis a of the track R and the longitudinal axis X of the portable electronic device 3 form the first angle A1, and the first angle A1 is greater than or equal to 45 degrees and less than 90 degrees, the cam 32 only has to be turned by an angle less then 90 degrees to fully extend the plug 312 out of the housing. In FIG. 7, when the plug 312 has been moved out of the housing 30, and the pin 321 is located at the second end of the track R and secured in position by the second position-limiting portion R2. In this state, the line b connecting the pin 321 and the first part of the pivot portion 320 forms a second angle A2 with the longitudinal axis X of the portable electronic device 3.

In the first preferred embodiment of the present invention, the second angle A2 is less than 45 degrees. With this feature, referring to FIG. 7, the core element 31 will apply a rightward force to the pin 321 when the plug 312 is inserted into a connector of an electronic apparatus, and a component of this rightward force generates a torque and rotates the cam 32 clockwise. As the pin 321 is pressed against the second end of the track R, the cam 32 is securely fixed in place, pressed against the track R, and prevented from further movement or rotation. In other words, the present invention is so designed to prevent the plug 312 from pushed back into the housing due to the reaction force generated by insertion of the plug 312. Referring to FIG. 7, when the first end of the cam 32 is turned in an opposite direction (e.g., counterclockwise as shown in the drawing) after the plug 312 is extended out of the housing 30, the pin 321 disengages from the second position-limiting portion R2 and slides toward the first end of the track R and consequently pulls the plug 312 into the housing 30 (see FIG. 5).

The structural features of the present invention allow the user to extend the plug 312 out of the housing 30 by rotating the cam 32 by an angle less than 90 degrees, thus significantly enhancing the convenience of using the portable electronic device. Furthermore, the simple construction of the present invention—particularly the reduced number of components and simplified configuration as compared with the prior arts—allows the core element 31 and the cam 32 to be easily installed in the housing 30 by an automated assembly process; hence, the portable electronic device 3 can be manufactured at high efficiency and low production costs. In addition, the structural simplicity of the present invention makes it possible to downsize or even miniaturize the portable electronic device 3, so as to better suit user needs and design requirements. A further advantage of the present invention is that all components can be produced from acrylonitrile butadiene styrene (ABS), an economical and readily available engineering plastic.

Figure 8:
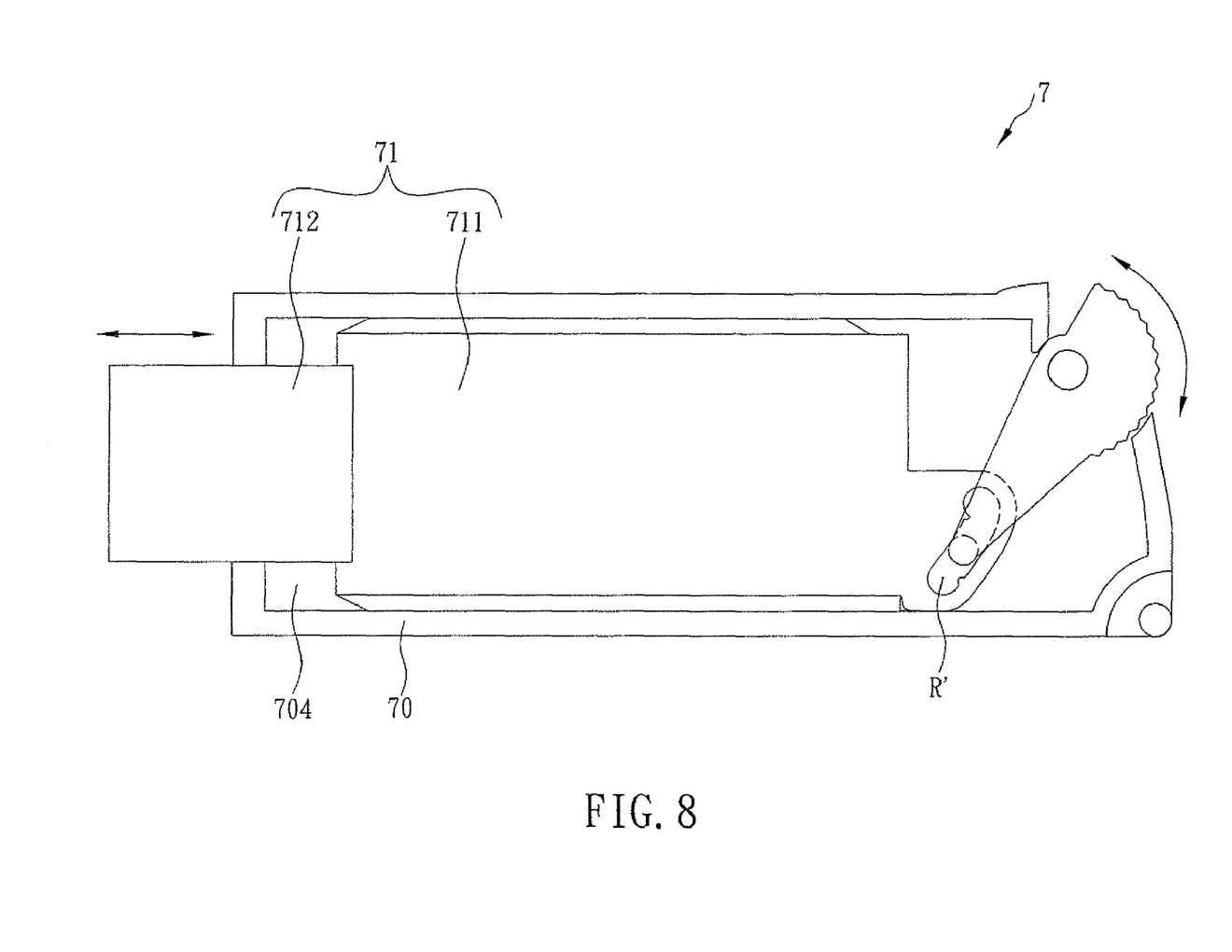
FIG. 8 is a schematic view of the second preferred embodiment of the present invention.

Apart from the technical contents of the foregoing first preferred embodiment, the inventor discloses a second embodiment that implements the concept of the present invention. Please refer to FIG. 8 for the second preferred embodiment of the present invention. The portable electronic device 7 in FIG. 8 is based on the same principle and has the same hardware structure as the first preferred embodiment, except that the core element 71 of the portable electronic device 7 dispenses with the tray 310 of FIG. 3 and only includes the circuit board 711 and the plug 712. The plug 712 is connected to the circuit board 711. The core element 71 is received in the receiving space 704 of the housing 70. The circuit board 711 is formed with a track R', which is adjacent to the rear end of the circuit board 711. The principle by which the portable electronic device 7 operates is identical to that disclosed in the first embodiment (see FIGS. 5 to 7) and therefore is not described repeatedly. The structural features of the second preferred embodiment are that, even in the absence of the aforesaid tray, the intended functions and effects of the present invention can be equally attained by forming the track R' directly on the circuit board 711.

What is claimed is:

1. A portable electronic device having a cam mechanism for plug extension and retraction, comprising:
    a housing laterally formed with a plug opening and having a receiving space extending inward from the plug opening;
    a core element received in the receiving space, comprising a circuit board, and having a front end provided with a plug, wherein the plug is connected to the circuit board and corresponds in position to the plug opening, the core element further having a track adjacent to a rear end of the core element; and
    a cam pivotally connected to the housing, wherein an actuation portion is shaped at a first end of the cam and extends out of the housing, and a pin is positioned adjacent to a second end of the cam and slidably coupled with the track on the core element, wherein: the pin is positioned at a first end of the track when the plug is retracted in the receiving space; and, when the cam is rotated in one direction, the cam pin slides toward a second end of the track and pushes the core element toward the plug opening and thereby moving the plug out of the housing to an extended position; when the cam is rotated in an opposite direction, the pin slides toward the first end of the track and pulls the core element into to the receiving space and thereby moving the plug into the housing to a retracted position.

2. The portable electronic device of claim 1, wherein the cam has a first part of a pivot portion adjacent to the first end of the cam, and the housing has a second part of a pivot portion corresponding in position to the first part of the pivot portion, and the first part of pivot portion is pivotally connected to the second part of the pivot portion such that the can is pivotally connected to the housing.

3. The portable electronic device of claim 2, wherein the first part of the pivot portion and the pin are respectively adjacent to two opposite sides of the housing when the pin is located at the first end of the track and the plug is received in the housing.

4. The portable electronic device of claim 3, wherein a line connecting the first and the second ends of the track forms a first angle with a longitudinal axis of the portable electronic device, and the first angle is greater than or equal to 45 degrees and less than 90 degrees.

5. The portable electronic device of claim 4, wherein when the pin is positioned at the second end of the track and the plug is extended out of the housing, a line connecting the pin and the pivot portion forms a second angle with the longitudinal axis of the portable electronic device, and the second angle is less than 45 degrees.

6. The portable electronic device of claim 5, wherein the core element comprises a tray for supporting the circuit board, and the track is provided on the tray and adjacent to a rear end thereof.

7. The portable electronic device of claim 6, wherein the cam has a first part of a rotation-limiting portion adjacent to the pivot portion, the housing has a second part of the rotation-limiting portion corresponding in position to the first part of the rotation-limiting portion, and the first and the second parts of the rotation-limiting portion are slidably connected to each other.

8. The portable electronic device of claim 7, wherein the track is provided therein with a first position-limiting portion adjacent to the first end of the track, and the pin is secured at the first end of the track by the first position-limiting portion to maintain the plug at the retracted position.

9. The portable electronic device of claim 8, wherein the track is provided therein with a second position-limiting portion adjacent to the second end of the track, and the pin is secured at the second end of the track by the second position-limiting portion to maintain the plug at the extended position.

10. The portable electronic device of claim 9, wherein the plug conforms to Universal Serial Bus (USB) specifications.

11. The portable electronic device of claim 10, wherein the circuit board comprises a memory module.

12. The portable electronic device of claim 10, wherein the circuit board comprises a communication module.

* * * * *